US 8,255,216 B2
Aug. 28, 2012

(12) United States Patent
White

(10) Patent No.: US 8,255,216 B2
(45) Date of Patent: Aug. 28, 2012

(54) SPEECH RECOGNITION OF CHARACTER SEQUENCES

(75) Inventor: Kenneth D. White, Boca Raton, FL (US)

(73) Assignee: Nuance Communications, Inc., Burlington, MA (US)

( * ) Notice: Subject to any disclaimer, the term of this patent is extended or adjusted under 35 U.S.C. 154(b) by 1047 days.

(21) Appl. No.: 11/554,047

(22) Filed: Oct. 30, 2006

(65) Prior Publication Data

US 2008/0103774 A1    May 1, 2008

(51) Int. Cl.
*G10L 15/08* (2006.01)
(52) U.S. Cl. ............... 704/236; 704/241; 704/251
(58) Field of Classification Search .......... 704/231, 704/233, 236, 238, 239, 240, 241, 246, 251, 704/252, 254

See application file for complete search history.

(56) References Cited

U.S. PATENT DOCUMENTS

| | | | | |
|---|---|---|---|---|
| 4,355,302 A * | 10/1982 | Aldefeld et al. | ............ | 704/243 |
| 4,498,148 A | 2/1985 | Glickman | | |
| 5,280,563 A * | 1/1994 | Ganong | ............ | 704/200 |
| 5,303,299 A * | 4/1994 | Hunt et al. | ............ | 379/88.01 |
| 5,337,394 A * | 8/1994 | Sejnoha | ............ | 704/241 |
| 5,621,857 A | 4/1997 | Cole et al. | | |
| 5,799,275 A * | 8/1998 | Itoh et al. | ............ | 704/241 |
| 5,809,469 A * | 9/1998 | Goldstein et al. | ............ | 704/270 |
| 5,909,665 A * | 6/1999 | Kato | ............ | 704/241 |
| 5,917,890 A * | 6/1999 | Brotman et al. | ............ | 379/88.01 |
| 5,930,754 A * | 7/1999 | Karaali et al. | ............ | 704/259 |
| 5,963,666 A * | 10/1999 | Fujisaki et al. | ............ | 382/187 |
| 5,995,928 A | 11/1999 | Nguyen et al. | | |
| 6,061,654 A * | 5/2000 | Brown et al. | ............ | 704/275 |
| 6,137,863 A | 10/2000 | Brown et al. | | |
| 6,195,638 B1 * | 2/2001 | Ilan et al. | ............ | 704/241 |
| 6,223,158 B1 * | 4/2001 | Goldberg | ............ | 704/252 |
| 6,393,444 B1 | 5/2002 | Lawrence | | |
| 6,581,034 B1 * | 6/2003 | Choi et al. | ............ | 704/238 |
| 6,629,071 B1 | 9/2003 | Mann | | |
| 6,694,296 B1 * | 2/2004 | Alleva et al. | ............ | 704/255 |
| 6,725,197 B1 | 4/2004 | Wuppermann et al. | | |
| 6,801,891 B2 * | 10/2004 | Garner et al. | ............ | 704/254 |
| 7,006,971 B1 * | 2/2006 | Stahl et al. | ............ | 704/242 |
| 7,124,130 B2 * | 10/2006 | Natori | ............ | 704/254 |
| 7,171,362 B2 * | 1/2007 | Hain | ............ | 704/241 |
| 7,739,111 B2 * | 6/2010 | Kaneko | ............ | 704/241 |
| 7,809,566 B2 * | 10/2010 | Meermeier | ............ | 704/255 |
| 2005/0203741 A1 * | 9/2005 | Thwing | ............ | 704/254 |
| 2006/0015336 A1 * | 1/2006 | Parthasarathy | ............ | 704/235 |
| 2006/0095263 A1 * | 5/2006 | Kawasaki et al. | ............ | 704/257 |
| 2006/0173680 A1 * | 8/2006 | Verhasselt et al. | ............ | 704/235 |
| 2006/0229870 A1 * | 10/2006 | Kobal | ............ | 704/252 |
| 2009/0094030 A1 * | 4/2009 | White | ............ | 704/246 |

* cited by examiner

*Primary Examiner* — Martin Lerner
(74) *Attorney, Agent, or Firm* — Wolf, Greenfield & Sacks, P.C.

(57) ABSTRACT

A method of and a system for processing speech. A spoken utterance of a plurality of characters can be received. A plurality of known character sequences that potentially correspond to the spoken utterance can be selected. Each selected known character sequence can be scored based on, at least in part, a weighting of individual characters that comprise the known character sequence.

24 Claims, 4 Drawing Sheets though recognition is very difficult to implement with a high level of accuracy. In consequence, words interpreted in this manner frequently are misidentified, resulting in much user frustration.

SPEECH RECOGNITION OF CHARACTER SEQUENCES

BACKGROUND OF THE INVENTION

The use of speech recognition has become widespread in recent decades. For example, speech recognition often is used in telephone call centers to process menu selections uttered by callers. Speech recognition also is frequently used by devices to receive user commands. For instance, mobile telephones typically are configured to receive voice inputs to initiate a telephone call, as well as access other telephone functions. Vehicle navigation systems also may include speech recognition to process user requests for directions. Further, modem computer applications sometimes include voice recognition as an option for converting spoken utterances into text that is incorporated into word processing documents and other electronic files. Still, there are a myriad of other devices and systems that implement speech recognition, and the number of such devices/systems continues to grow.

Speech recognition systems sometimes have difficulty interpreting certain types of words, such as names that are relatively unique. Navigation systems, in particular, oftentimes have difficulty in recognizing utterances that identify points of interest with words other than known street names. In such circumstances, a user may be prompted to utter letters to spell one or more words to identify a point of interest. Such utterances are considered an unconstrained sequence since potential permutations of letters are not bounded to a few likely combinations. Moreover, in comparison to words, letters are very difficult to recognize using speech recognition. Accordingly, unconstrained letter recognition is very difficult to implement with a high level of accuracy. In consequence, words interpreted in this manner frequently are misidentified, resulting in much user frustration.

BRIEF SUMMARY OF THE INVENTION

The present invention is directed to speech recognition. One embodiment of the present invention can include a method of processing speech. The method can include receiving a spoken utterance of a plurality of characters. The method also can include selecting a plurality of known character sequences that potentially correspond to the spoken utterance and, for each selected known character sequence, scoring such character sequence based on, at least in part, a weighting of individual characters that comprise the known character sequence.

Another embodiment of the present invention can include a speech recognition system. The system can include a primary speech processor that processes audio signals to identify characters potentially represented by a spoken utterance. The system also can include a character post-processor that selects a plurality of known character sequences that potentially correspond to the spoken utterance and, for each selected known character sequence, scores such character sequence based on, at least in part, a weighting of individual characters that comprise the known character sequence.

Yet another embodiment of the present invention can include a machine readable storage being programmed to cause a machine to perform the various steps and/or functions described herein.

DETAILED DESCRIPTION OF THE INVENTION

Figure 1:
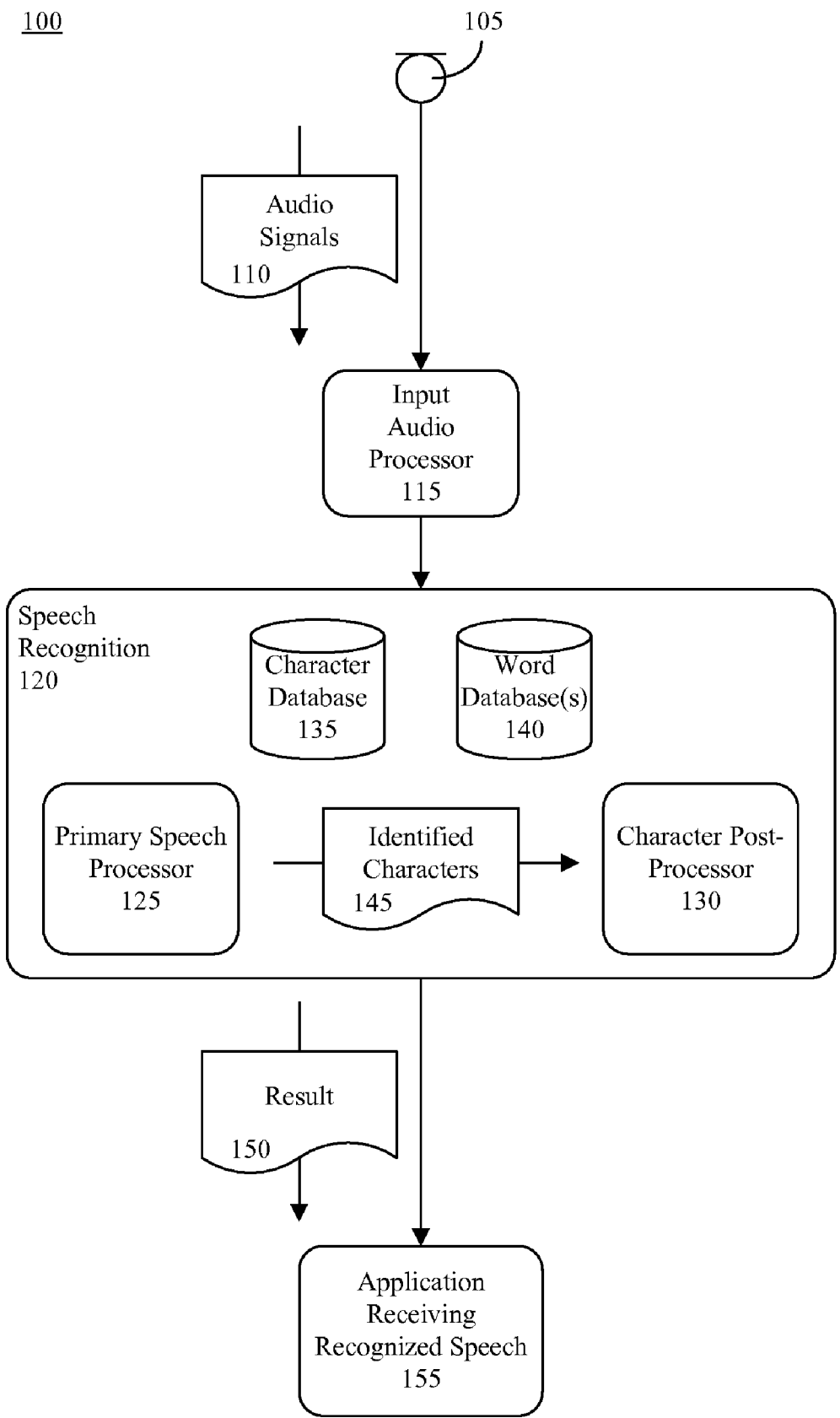
FIG. 1 is a block diagram illustrating a system in accordance with an aspect of the present invention.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention relates to a speech recognition system. In response to detecting a spoken utterance comprising a sequence of uttered characters, the speech recognition system can process such utterance to identify known characters likely to correspond to the uttered characters. The speech recognition system then can apply character post-processing to the identified characters. During post-processing, the speech recognition system can identify known sequences of characters (e.g. words or phrases) likely to match the spoken utterance, and assign a scoring to each of such known sequences. The scoring can be based on, at least in part, a weighting assigned to individual characters contained in the known sequences. In one arrangement, a known sequence of characters having the highest score can be selected as a probable match to the intended word. In another arrangement, a plurality of known sequences having high scores can be selected as probable matches.

FIG. 1 is a block diagram illustrating a system 100 in accordance with an aspect of the present invention. The system 100 can include an input audio transducer 105 (e.g. microphone). The input audio transducer 105 can detect spoken utterances as acoustic signals and convert the acoustic signals into electrical audio signals (hereinafter "audio signals") 110. An input audio processor 115 can be provided to process the audio signals 110, for example to apply equalization to the audio signals 110, apply analog to digital conversion, and/or perform any other suitable audio signal processing functions.

After being processed by the input audio processor 115, the audio signals 110 can be communicated to a speech recognition module 120. The speech recognition module 120 can comprise a primary speech processor 125 and a character post-processor 130. The primary speech processor 125 can process the audio signals 110 to identify characters potentially represented by a spoken utterance. For example, the audio signals 110 can be parsed into segments, and each segment can be processed to identify a character contained in a character set that potentially correlates to the segment. The character set can be, for example, stored in a character database 135 or a character data file. Such processing is known to these skilled in the art of speech recognition. Characters 145 identified by the primary speech processor 125 then can be communicated to the character post-processor 130. The characters 145 can be alphanumeric characters, punctuation characters, or any other characters that can be associated with a spoken utterance.

The character post-processor 130 can process the identified characters 145 in accordance with the processes described herein in order to select one or more known character sequences, such as words or phrases, which have a high probability of correctly matching the spoken utterance. Candidates for such known character sequences may be selected from one or more word databases 140. The word databases 140 can include character sequences from a single language or character sequences from a plurality of languages. Moreover, the word databases 140 can include all known words and/or phrases, or a limited set of character sequences. For instance, the word databases 140 can comprise only words and/or phrases associated with street names, points of interest, telephone book entries, etc. Still, the word databases 140 can include any other sets of words and/or phrases and the invention is not limited in this regard.

The characters in each selected known character sequence then can be compared to the identified characters. For each character match that is found, a value associated with the known character can be retrieved from the character set (e.g. the character database 135) or another suitable data file, and added to a cumulative score associated with the known character sequence. In the character set, the value can be associated with the known character in any suitable manner. For instance, the value can be pre-assigned to the character. The value can be contained in a same data record as the matched character, or associated with the matched character in any other suitable manner. The value can represent a probability that the identified character is the correct character. For example, the value can represent the probability that the identified character was actually uttered. Such probability can be based on a frequency in which the character is known to be uttered, a probability that such character may be incorrectly identified, and/or any other suitable parameters.

The scores for the respective known character sequences then can be evaluated. The character sequence selected as having a highest score (i.e. highest probability of correctly matching the spoken utterance) can be communicated as a result 150 to an application 155 that receives recognized speech input. In another arrangement, a plurality of known character sequences having high scores can be communicated to the application 155, and the application 155 can perform further processing on such known character sequences.

Figure 2:
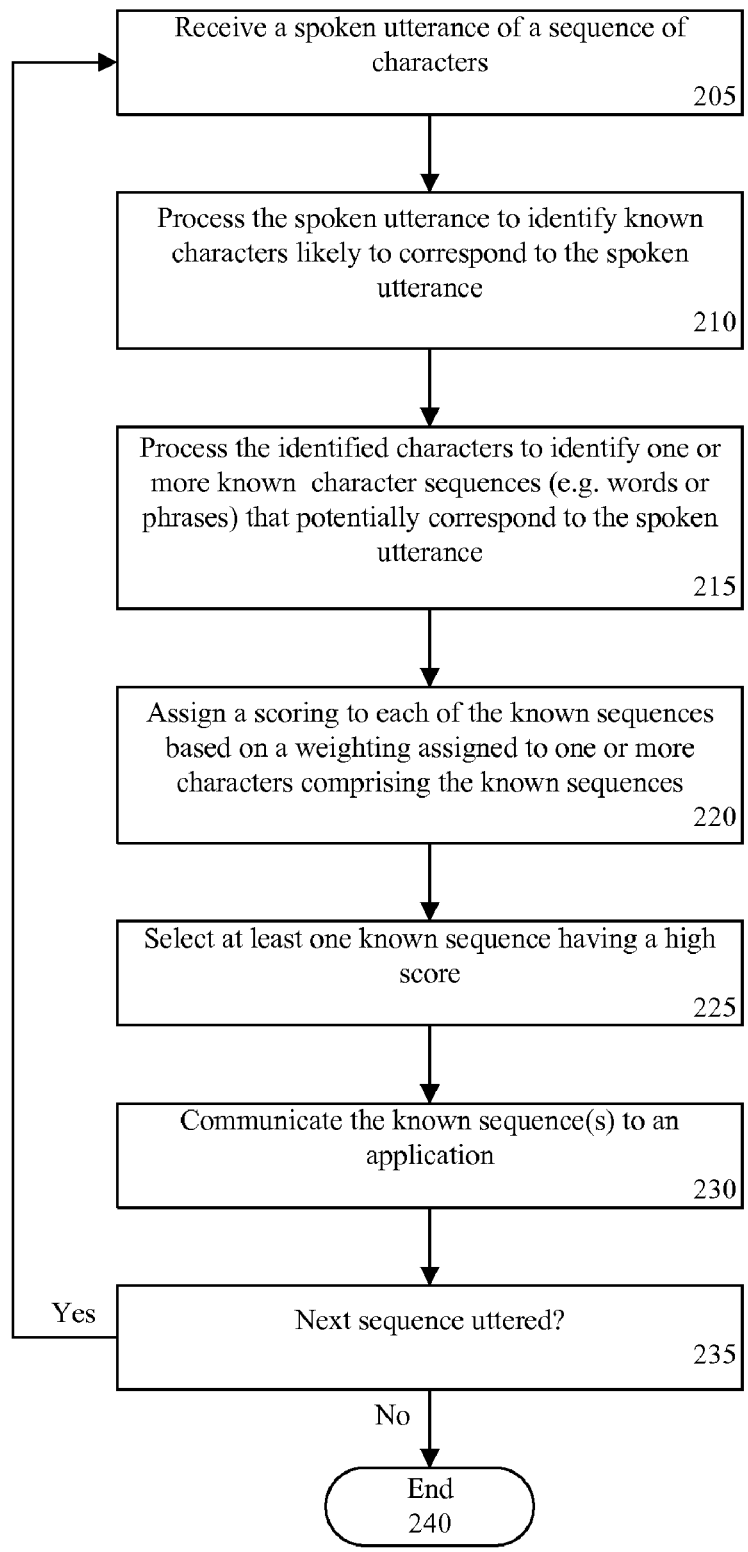
FIG. 2 is a flow chart illustrating a method of selecting a sequence of known characters that potentially matches a spoken utterance.

FIG. 2 is a flow chart illustrating a method 200 of selecting a character sequence that potentially matches a spoken utterance of one or more characters. At step 205, a spoken utterance can be received. The spoken utterance can include a sequence of characters. The sequence can be constrained (e.g. limited to a maximum number of characters) or unconstrained.

At step 210, the spoken utterance can be processed to identify characters likely to correspond to the spoken utterance. At step 215, the identified characters then can be processed to identify one or more known character sequences that potentially correspond to the spoken utterance. The character sequences can be words or phrases. For example, the character sequences can represent names, street names, points of interest, objects, etc. The known character sequences can be selected from one or more databases, one or more data files, or from any other suitable form of character storage.

At step 220, a score can be assigned to each of the identified known character sequences. The scores can be based on weighting assigned to one or more characters comprising such sequences, as will be described herein. Proceeding to step 225, a known sequence having a high score can be selected. Alternatively, a plurality of known character sequences having high scores can be selected. For example, if three of the known character sequences all exceed a particular score, each of the three known character sequences can be selected.

At step 230, the selected known character sequence(s) can be communicated to an application that may receive recognized speech. Referring to decision box 235, if a next sequence is uttered, the process can return to step 205 and repeat. If a next sequence is not uttered, at step 240 the process can end.

Figure 3:
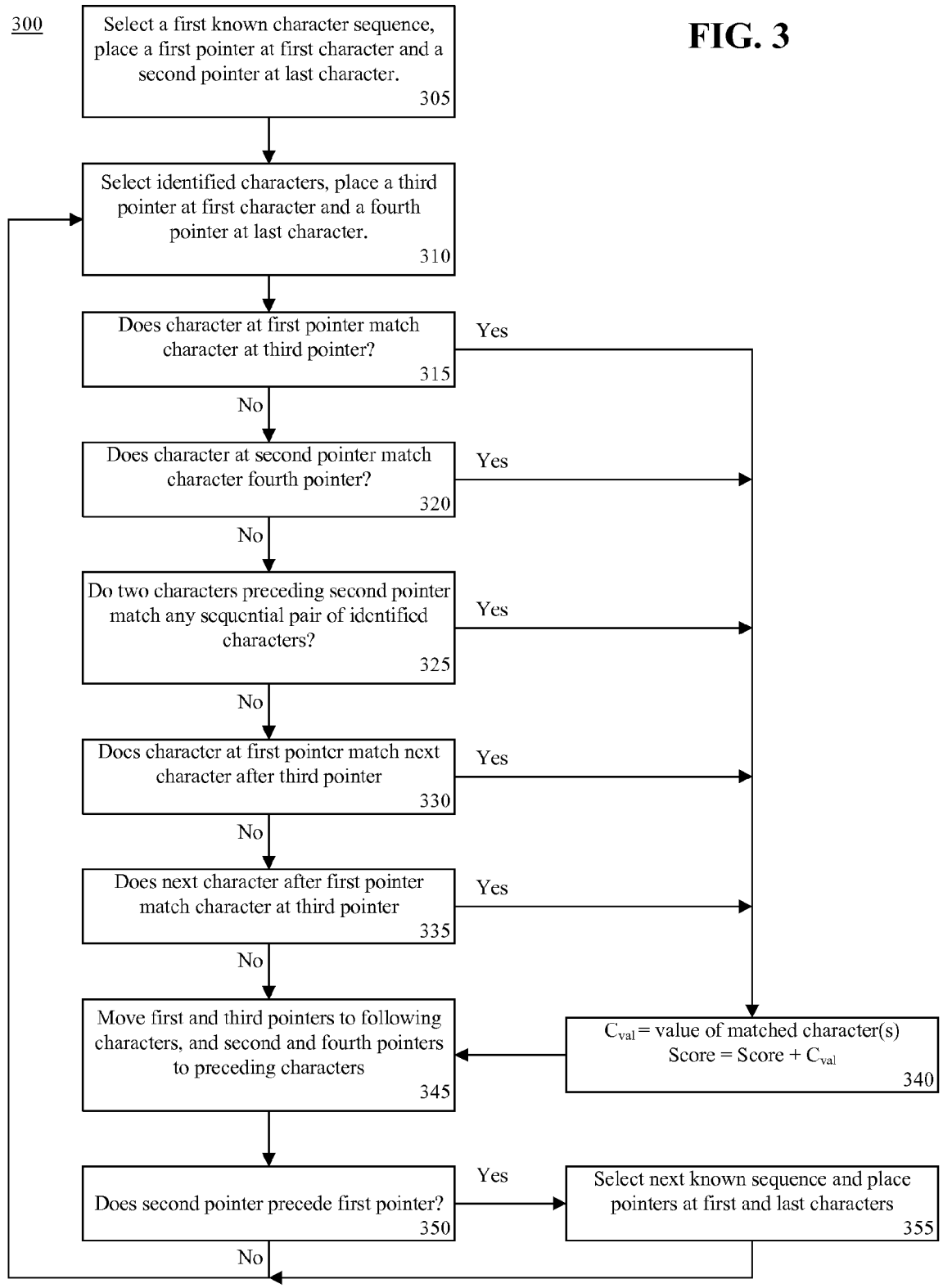
FIG. 3 is a flow chart illustrating a method of assigning scoring to known sequences of characters.
Figure 4:
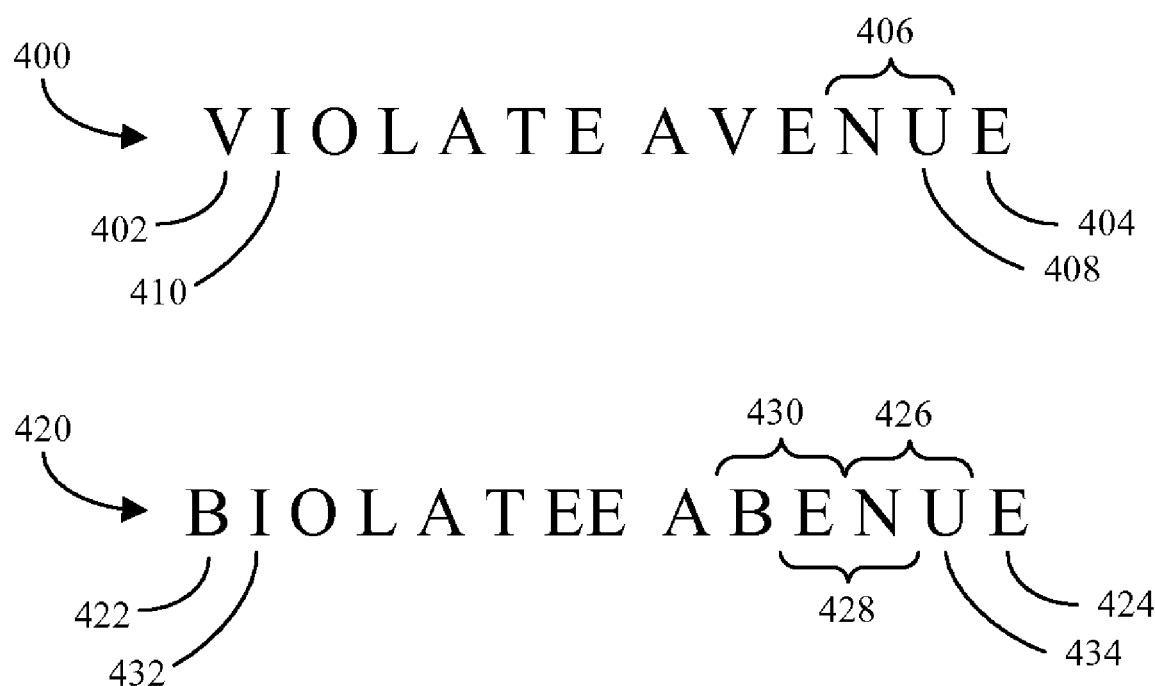
FIG. 4 is a diagram depicting examples of a known character sequence and an identified character sequence.

FIG. 3 is a flow chart illustrating a method 300 of assigning scoring to known sequences of characters. Such method can be implemented at step 220 of the method 200 of FIG. 2. FIG. 4 is a diagram depicting examples of a known character sequence 400 and an identified character sequence 420.

Referring to FIG. 3 and FIG. 4, at step 305 the first known character sequence 400 can be selected. An initial score of zero can be associated with the known character sequence 400. A first pointer can be assigned to the first character 402 of the known character sequence 400 and a second pointer can be assigned to the last character 404 of the sequence 400. At step 310, the characters identified as likely corresponding to the spoken utterance can be selected as an identified character sequence 420. A third pointer can be assigned to a first character 422 of the identified character sequence 420 and a second pointer 424 can be assigned to a last character 424 of such character sequence 420.

At decision box 315, a determination can be made whether the known character 402 at the first pointer matches the identified character 422 at the third pointer. If not, the process can proceed to decision box 320 and a determination can be made whether the known character 404 at the second pointer matches the identified character 424 at the fourth pointer. If such characters do not match, at decision box 325, a determination can be made whether the two characters 406 in the known character sequence 400 immediately preceding the character 404 identified by the second pointer match any sequential pair of characters 426, 428, 430 in the identified character sequence 420.

If a match for the pair of characters 406 is not found in the identified character sequence 420, the process can proceed to step 330 and a determination can be made whether the known character 402 at the first pointer matches the identified character 432 immediately following the character 422 identified by the third pointer. If no such match is found, at decision box 335 a determination can be made whether the known character 410 immediately following the character 402 identified by the first pointer matches the identified character 422 at the third pointer. If not, the process can proceed to step 345. At step 345, the first and third pointers can be re-assigned to identify next immediately following characters in their respective character sequences 400, 420. For example, the first pointer can be reassigned from character 402 to the character 410, and the second pointer can be reassigned from the character 422 to the character 432. Further, second and fourth pointers can be reassigned to the immediately preceding characters in their respective character sequences. For example, the second pointer can be reassigned from character 404 to character 408, and the further pointer can be reassigned from character 424 to character 434.

Referring again to decision boxes 315-335, whenever a match is found, for example, if in step 320 the known character 404 at the second pointer does match the identified character 424 at the fourth pointer, the process can proceed to step 340. At step 340, a value associated with the known character 404 can be retrieved and added to a cumulative score associated with the selected known character sequence 400. For example, the value can be retrieved from a character database or data file.

After the value of the matched character has been added to the cumulative score of the known character sequence, the process can continue to step 345 and the pointers can be reassigned as previously described. Referring to decision box 350, if the second pointer does not precede the first pointer the process can return to step 310 and continue.

If the second pointer does precede the first pointer, the process can proceed to step 355 and a next known character sequence can be selected. Again, the first pointer can be assigned to the first character of the selected known sequence and the second pointer can be assigned to the last character of the selected known sequence. Further, the third pointer again can be assigned to the first character 422 of the identified sequence and the fourth pointer again can be assigned to the last character 424 of the identified sequence. The process then can return to step 310 and continue.

In flowcharts presented in FIG. 2 and FIG. 3, additional processing steps can be performed and/or processing steps can be removed. For example, additional comparison steps can be performed in FIG. 3. For instance, a comparison can be performed to determine whether a series of three or more known characters match a series of three or more identified characters. Still, a myriad of other comparisons can be made and the invention is not limited in this regard.

The flowcharts and block diagram in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A method of processing speech, the method comprising:
   receiving a spoken utterance of a plurality of uttered characters;
   determining an identified character sequence by determining corresponding identified characters for individual ones of the plurality of uttered characters;
   selecting a plurality of known character sequences that potentially correspond to the identified character sequence; and
   for each selected known character sequence, scoring such known character sequence, using a processor, based at least in part on a weighting of individual characters that comprise the known character sequence, wherein scoring the known character sequence comprises:
      responsive to determining that a first character of the known character sequence matches a second identified character of the identified character sequence, selecting a value that corresponds to the first character of the known character sequence; and
      adding the selected value to a cumulative score associated with the known character sequence.

2. The method of claim 1, wherein the weighting is based at least in part on frequencies of utterance of the individual characters.

3. The method of claim 1, wherein the selected value is pre-assigned to the first character in a character set.

4. The method of claim 1, wherein:
   no characters precede the first character in the known character sequence, and
   one identified character precedes the second identified character in the identified character sequence.

5. The method of claim 1, further comprising:
   selecting the known character sequence having the highest cumulative score; and
   communicating the selected known character sequence having the highest cumulative score to an application that receives recognized speech.

6. The method of claim 1, wherein selecting the plurality of known character sequences comprises selecting character sequences from a limited set of character sequences.

7. A method of processing speech, the method comprising:
   receiving a spoken utterance of a plurality of uttered characters;
   determining an identified character sequence by determining corresponding identified characters for individual ones of the plurality of uttered characters;
   selecting a plurality of known character sequences that potentially correspond to the identified character sequence; and
   for each selected known character sequence, scoring such known character sequence, using a processor, based at least in part on a weighting of individual characters that comprise the known character sequence, wherein scoring the known character sequence comprises:
      responsive to determining that a second character of the known character sequence matches a first identified character of the identified character sequence, selecting a value that corresponds to the second character of the known character sequence; and
      adding the selected value to a cumulative score associated with the known character sequence.

8. The method of claim 7, further comprising:
   selecting the known character sequence having the highest cumulative score; and
   communicating the selected known character sequence having the highest cumulative score to an application that receives recognized speech.

9. The method of claim 7, wherein selecting the plurality of known character sequences comprises selecting character sequences from a limited set of character sequences.

10. The method of claim 7, wherein:
    no identified characters precede the first identified character in the identified character sequence, and
    one character precedes the second character in the known character sequence.

11. The method of claim 7, wherein the weighting is based at least in part on frequencies of utterance of the individual characters.

12. The method of claim 7, wherein the selected value is pre-assigned to the second character in a character set.

13. A speech recognition system comprising:
    a primary speech processor that processes an audio signal comprising a spoken utterance of a plurality of uttered characters, wherein the processing comprises determining an identified character sequence by determining corresponding identified characters for individual ones of the plurality of uttered characters; and
    a character post-processor that selects a plurality of known character sequences that potentially correspond to the identified character sequence and, for each selected known character sequence, scores such known character sequence based at least in part on a weighting of individual characters that comprise the known character sequence, wherein the character post-processor selects a value that corresponds to a first character of the known character sequence in response to determining that the first character of the known character sequence matches a second identified character of the identified character sequence, and adds the selected value to a cumulative score associated with the known character sequence.

14. The system of claim 13, wherein the weighting is based at least in part on frequencies of utterance of the individual characters.

15. The system of claim 13, wherein the selected value is pre-assigned in a character set to the first character.

16. The system of claim 13, wherein:
no characters precede the first character in the known character sequence, and
one identified character precedes the second identified character in the identified character sequence.

17. A speech recognition system comprising:
a primary speech processor that processes an audio signal comprising a spoken utterance of a plurality of uttered characters, wherein the processing comprises determining an identified character sequence by determining corresponding identified characters for individual ones of the plurality of uttered characters; and
a character post-processor that selects a plurality of known character sequences that potentially correspond to the identified character sequence and, for each selected known character sequence, scores such known character sequence based at least in part on a weighting of individual characters that comprise the known character sequence, wherein the character post-processor selects a value that corresponds to a second character of the known character sequence in response to determining that the second character of the known character sequence matches a first identified character of the identified character sequence, and adds the selected value to a cumulative score associated with the known character sequence.

18. The system of claim 17, wherein:
no identified characters precede the first identified character in the identified character sequence, and
one character precedes the second character in the known character sequence.

19. The system of claim 17, wherein the weighting is based at least in part on frequencies of utterance of the individual characters.

20. The system of claim 17, wherein the selected value is pre-assigned in a character set to the second character.

21. A computer program product comprising:
a non-transitory computer readable storage medium having computer usable program code that, when executed, performs a method of processing speech, the method comprising:
receiving a spoken utterance of a plurality of uttered characters;
determining an identified character sequence by determining corresponding identified characters for individual ones of the plurality of uttered characters;
selecting a plurality of known character sequences that potentially correspond to the identified character sequence; and
for each selected known character sequence, scoring such known character sequence based at least in part on a weighting of individual characters that comprise the known character sequence, wherein scoring the known character sequence comprises:
responsive to determining that a first character of the known character sequence matches a second identified character of the identified character sequence, selecting a value that corresponds to the first character of the known character sequence; and
adding the selected value to a cumulative score associated with the known character sequence.

22. The computer program product of claim 21, wherein the selected value is pre-assigned to the first character in a character set.

23. A computer program product comprising:
a non-transitory computer readable storage medium having computer usable program code that, when executed, performs a method of processing speech, the method comprising:
receiving a spoken utterance of a plurality of uttered characters;
determining an identified character sequence by determining corresponding identified characters for individual ones of the plurality of uttered characters;
selecting a plurality of known character sequences that potentially correspond to the identified character sequence; and
for each selected known character sequence, scoring such known character sequence based at least in part on a weighting of individual characters that comprise the known character sequence, wherein scoring the known character sequence comprises:
responsive to determining that a second character of the known character sequence matches a first identified character of the identified character sequence, selecting a value that corresponds to the second character of the known character sequence; and
adding the selected value to a cumulative score associated with the known character sequence.

24. The computer program product of claim 23, wherein the selected value is pre-assigned to the second character in a character set.

\* \* \* \* \*